United States Patent
Cao et al.

(10) Patent No.: US 9,844,728 B2
(45) Date of Patent: Dec. 19, 2017

(54) PROVIDING SOCIAL NETWORK CONTENT IN GAMES

(75) Inventors: Jinming Cao, Beijing (CN); Lin Hou, Beijing (CN); Chao Guo, Beijing (CN); Xingguang Yu, RuiShanShi (CN); Huiqiang Liu, San Francisco, CA (US); Kerry Yang, Beijing (CN); Lin Lin, Beijing (CN)

(73) Assignee: Zynga Inc., San Francisco, CA (US)

( * ) Notice: Subject to any disclaimer, the term of this patent is extended or adjusted under 35 U.S.C. 154(b) by 628 days.

(21) Appl. No.: 14/358,967

(22) PCT Filed: Dec. 16, 2011

(86) PCT No.: PCT/CN2011/002118
§ 371 (c)(1),
(2), (4) Date: May 16, 2014

(87) PCT Pub. No.: WO2013/086663
PCT Pub. Date: Jun. 20, 2013

(65) Prior Publication Data
US 2014/0315639 A1    Oct. 23, 2014

(51) Int. Cl.
*A63F 9/24* (2006.01)
*A63F 13/00* (2014.01)
*G06F 17/00* (2006.01)
*G06F 19/00* (2011.01)
*A63F 13/79* (2014.01)
(Continued)

(52) U.S. Cl.
CPC .............. *A63F 13/79* (2014.09); *A63F 13/12* (2013.01); *H04L 51/32* (2013.01); *A63F 2300/5546* (2013.01); *A63F 2300/57* (2013.01)

(58) Field of Classification Search
CPC ...... A63F 13/23; A63F 13/45; A63F 13/5375; A63F 13/55; A63F 13/60; A63F 13/69; A63F 2300/00826
See application file for complete search history.

(56) References Cited

U.S. PATENT DOCUMENTS

2009/0199111 A1    8/2009  Emori et al.
2009/0253513 A1*  10/2009  Ducheneaut ............ A63F 13/12
                                                             463/42

FOREIGN PATENT DOCUMENTS

CN          102054127 A      5/2011
CN          102194036 A      9/2011
(Continued)

OTHER PUBLICATIONS

"International Application Serial No. PCT/CN2011/002118, Search Report dated Sep. 27, 2012", 3 pgs.
(Continued)

*Primary Examiner* — Milap Shah
*Assistant Examiner* — Jason Pinheiro
(74) *Attorney, Agent, or Firm* — Schwegman Lundberg & Woessner, P.A.

(57) ABSTRACT

An apparatus and method for providing social network content in an online game is disclosed herein. Content is obtained from a social network site and is displayed within the game. The game also provides a mechanism for the user of the game to generate content to the posted within the social network from within the game. Such generated content is automatically posted in the social network for a recipient specified by the user.

13 Claims, 9 Drawing Sheets

(51) Int. Cl.
    *H04L 12/58*    (2006.01)
    *A63F 13/30*    (2014.01)

(56)            References Cited

FOREIGN PATENT DOCUMENTS

CN          104247336 A     12/2014
WO      WO-2013086663 A1    6/2013

OTHER PUBLICATIONS

"International Application Serial No. PCT/CN2011/002118, Written Opinion dated Sep. 27,2012", 4 pgs.
"Chinese Application Serial No. 201180076359.1, Amendment filed Jul. 8, 2014", w/English Translation, 59 pgs.
"International Application Serial No. PCT/CN2011/002118, International Preliminary Report on Patentability dated Jul. 26, 2014", 6 pgs.
"Chinese Application Serial No. 201180076359.1, Office Action dated Nov. 14, 2016", w/English Translation, 17 pgs.

* cited by examiner

PROVIDING SOCIAL NETWORK CONTENT IN GAMES

This application is a 371 Application of PCT/CN2011/002118 entitled PROVIDING SOCIAL NETWORK CONTENT IN GAMES, filed Dec. 16, 2011, which is hereby incorporated herein by reference in its entirety.

TECHNICAL FIELD

The present disclosure relates to social networks and games in general, and in particular embodiments, to combining social networks with computer-implemented online games that include non-player characters.

BACKGROUND

Many games provide a virtual world or some other imagined playing space where a player of the game controls one or more player characters, engages in in-game actions, and/or acquires in-game assets. Player characters (also referred to as characters or PCs) can be considered in-game representations of the controlling player. A game engine accepts inputs from the player, determines player character actions, decides outcomes of events and presents the player with a game display illuminating what happened. In some games with multiple players, each player may control one or more player characters.

A player of a game can directly engage in in-game actions or indirectly via a player character in a role-playing game. For example, in-game actions may include building a virtual town, growing virtual crops, going on a quest, buying/selling virtual items from a virtual store, and the like. Many games also support acquisition of in-game assets (also referred to as rewards or loot) by a player in order to facilitate control of player characters or to perform in-game actions. Examples of in-game assets include, but are not limited to, acquiring game points, gold coins, experience points, character levels, character attributes, virtual cash, game keys, and other in-game items of value within the game.

In some games, a game engine may manage and display non-player characters (NPCs). Unlike player characters actively managed by players, NPCs get their movements, actions, decisions, etc. from the game engine. The game engine many provide NPCs within a game, for example, to make the game space more realistic or because the game does not have player characters. Because NPCs are not controlled by player inputs, they can sometimes appear lifeless or indistinguishable from each other.

BRIEF DESCRIPTION OF THE DRAWINGS

Some embodiments are illustrated by way of example and not limitations in the figures of the accompanying drawings, in which.

The headings provided herein are for convenience only and do not necessarily affect the scope or meaning of the claimed invention.

DETAILED DESCRIPTION

The following description is presented to enable any person skilled in the art to create and use a computer system configuration and related method and article of manufacture to obtain and provide social network content and/or features within an online game. In some embodiments, a user of the game also has a social network account. The user's social network account is configured to receive and post messages (or other content) generated by friends or other persons designated as being connected to the user within the social network. As an example, the user may have a unique social network page within the social network platform that displays such messages (or other content). These messages (and associated information such as an identifier of a friend attributable for a given message) may be obtained from the social network platform and presented within the online game as the user is playing the game. The game also provides features for the user to interact with the social network content displayed within the game, such as providing the ability for the user to reply to a social network message from within the game. Such reply is automatically provided to the social network platform so that the reply appears on the user's social network page.

Various modifications to the preferred embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention may be practiced without the use of these specific details. In other instances, well-known structures and processes are shown in block diagram form in order not to obscure the description of the invention with unnecessary detail. Thus, the present invention is not intended to be limited to the embodiments shown, but is to be accorded the widest scope consistent with the principles and features disclosed herein.

Figure 1:
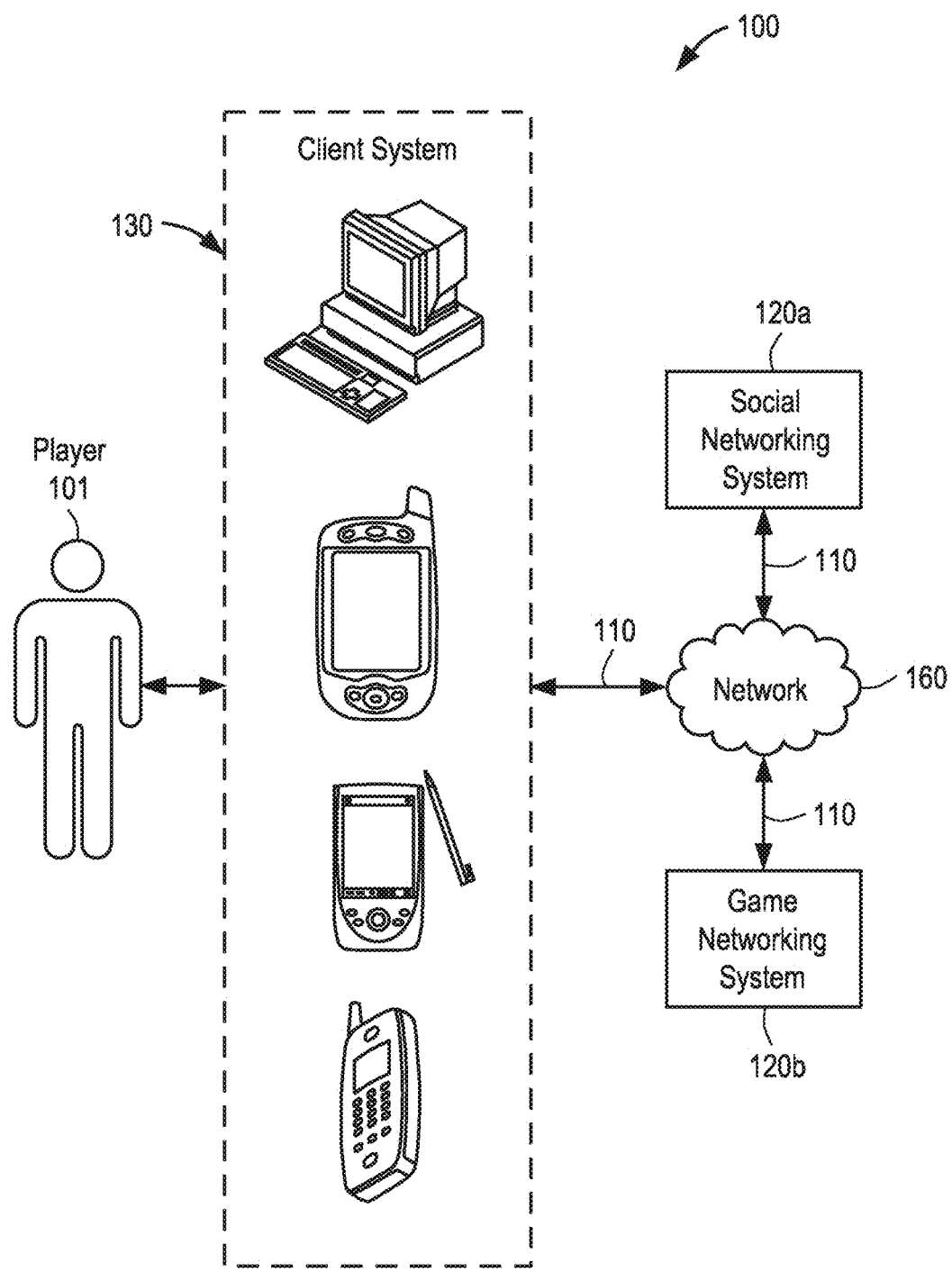
FIG. 1 illustrates an exemplary system for implementing various disclosed embodiments for providing social network content within a game.

FIG. 1 illustrates an exemplary system 100 for implementing various disclosed embodiments. In particular embodiments, system 100 comprises player or user 101, social networking system 120a, game networking system 120b, client system 130, and network 160. The components of system 100 can be connected to each other in any suitable configuration, using any suitable type of connection. The components may be connected directly or over a network 160, which may be any suitable network. For example, one or more portions of network 160 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another type of network, or a combination of two or more such networks.

Social networking system 120a is a network-addressable computing system that can host one or more social graphs. Social networking system 120a can generate, store, receive, and transmit social networking data. Social networking system 120a can be accessed by the other components of system 100 either directly or via network 160. Game networking system 120b is a network-addressable computing system that can host one or more online games. Game networking system 120b can generate, store, receive, and transmit game-related data, such as, for example, game account data, game input, game state data, and game displays. Game networking system 120b can be accessed by the other components of system 100 either directly or via network 160. Player 101 may use client system 130 to access, send data to, and receive data from social networking system 120a and game networking system 120b. Client system 130 can access social networking system 120 or game networking system 120b directly, via network 160, or via a third-party system. As an example and not by way of limitation, client system 130 may access game networking system 120b via social networking system 120a. Client system 130 can be any suitable computing device, such as a personal computer, laptop, cellular phone, smart phone, computing tablet, etc.

Although FIG. 1 illustrates a particular number of players 101, social networking systems 120a, game networking systems 120b, client systems 130, and networks 160, this disclosure contemplates any suitable number of players 101, social networking systems 120a, game networking systems 120b, client systems 130, and networks 160. As an example and not by way of limitation, system 100 may include one or more game networking systems 120b and no social networking systems 120a. As another example and not by way of limitation, system 100 may include a system that comprises both social networking system 120a and game networking system 120b. Moreover, although FIG. 1 illustrates a particular arrangement of player 101, social networking system 120a, game networking system 120b, client system 130, and network 160, this disclosure contemplates any suitable arrangement of player 101, social networking system 120a, game networking system 120b, client system 130, and network 160.

The components of system 100 may be connected to each other using any suitable connections 110. For example, suitable connections 110 include wireline (such as Digital Subscriber Line (DSL) or Data Over Cable Service Interface Specification (DOCSIS)), wireless (such as Wi-Fi or Worldwide Interoperability for Microwave Access (WiMAX)), or optical (such as Synchronous Optical Network (SONET) or Synchronous Digital Hierarchy (SDH)) connections. In particular embodiments, one or more connections 110 each include an ad hoc network, an intranet, an extranet, a VPN, a LAN, a WLAN, a WAN, a WWAN, a MAN, a portion of the Internet, a portion of the PSTN, a cellular telephone network, or another type of connection, or a combination of two or more such connections. Connections 110 need not necessarily be the same throughout system 100. One or more first connections 110 may differ in one or more respects from one or more second connections 110. Although FIG. 1 illustrates particular connections between player 101, social networking system 120a, game networking system 120b, client system 130, and network 160, this disclosure contemplates any suitable connections between player 101, social networking system 120a, game networking system 120b, client system 130, and network 160. As an example and not by way of limitation, in particular embodiments, client system 130 may have a direct connection to social networking system 120a or game networking system 120b, bypassing network 160.

In an online computer game, a game engine manages the game state of the game. Game state comprises all game play parameters, including player character state, non-player character (NPC) state, in-game object state, game world state (e.g., internal game clocks, game environment), and other game play parameters. Each player 101 controls one or more player characters (PCs). The game engine controls all other aspects of the game, including non-player characters (NPCs), and in-game objects. The game engine also manages game state, including player character state for currently active (online) and inactive (offline) players.

An online game can be hosted by game networking system 120b, which can be accessed using any suitable connection with a suitable client system 130. A player may have a game account on game networking system 120b, wherein the game account can contain a variety of information associated with the player (e.g., the player's personal information, financial information, purchase history, player character state, game state). In some embodiments, a player may play multiple games on game networking system 120b, which may maintain a single game account for the player with respect to all the games, or multiple individual game accounts for each game with respect to the player. In some embodiments, game networking system 120b can assign a unique identifier to each player 101 of an online game hosted on game networking system 120b. Game networking system 120b can determine that a player 101 is accessing the online game by reading the user's cookies, which may be appended to HTTP requests transmitted by client system 130, and/or by the player 101 logging onto the online game.

In particular embodiments, player 101 may access an online game and control the game's progress via client system 130 (e.g., by inputting commands to the game at the client device). Client system 130 can display the game interface, receive inputs from player 101, transmitting user inputs or other events to the game engine, and receive instructions from the game engine. The game engine can be executed on any suitable system (such as client system 130, social networking system 120a, or game networking system 120b). As an example and not by way of limitation, client system 130 can download client components of an online game, which are executed locally, while a remote game server, such as game networking system 120b, provides backend support for the client components and may be responsible for maintaining application data of the game, processing the inputs from the player, updating and/or synchronizing the game state based on the game logic and each input from the player, and transmitting instructions to client system 130. As another example and not by way of limitation, each time player 101 provides an input to the game through the client system 130 (for example, by typing on the keyboard or clicking the mouse of client system 130), the client components of the game may transmit the player's input to game networking system 120b. In various embodiments, an online game can be embedded into a third-party website. The game can be hosted by the networking system of the third-party website, or it can be hosted on game system 120b and merely accessed via the third-party website. The embedded online game can be hosted solely on a server of game system 120b or using a third-party vendor server. In addition, any combination of the functions of the present disclosure can be hosted on or provided from any number of distributed network resources. For example, one or more executable code objects that implement all or a portion of the game can be downloaded to a client system for execution.

Figure 2:
FIG. 2 illustrates an example of a webpage-based game interface for an online game according to some embodiments.

FIG. 2 illustrates an example of a webpage-based game interface for an online game accessed by a browser (e.g., Firefox, Chrome, Internet Explorer, etc.) at the client system 130. In various embodiments, a user of a client system 130 can use a browser client to access the online game over the Internet (or other suitable network). The game interface 200 illustrated in FIG. 2 may be automatically generated and presented to the user in response to the user visiting or accessing the game operator's website or a third-party's website from client system 130 with a browser client. Game networking system 120b can transmit data to client system 130 allowing it to display game interface 200, which is typically some type of graphic user interface. For example, the webpage downloaded to client system 130 may include an embedded call that causes client system 130 to download an executable object, such as a Flash .SWF object, which executes on client system 130 and renders the game within the context of the webpage. Other interface types are possible, such as server-side rendering and the like. Game interface 200 is configured to receive signals from the user via client system 130. For example, the user can click on game interface 200, or enter commands from a keyboard or other suitable input device. The game engine can respond to these signals to allow game play. The display of game interface 200 can change based on the output of the game engine, the input of the player, and other signals from game system 120b and client system 130.

The game interface 200 can display various game components, such as the game environment, options available to the player (e.g., in-game actions, preferences, settings, etc.), game results, etc. Some components of the game interface 200 may be static, while others may be dynamic (e.g., changing with game play). The user may be able to interact with some components (e.g., player character, NPCs, virtual objects, etc.) and not interact with other components (e.g., the background of the virtual world, such as the virtual street or sidewalk). The user can engage in specific in-game actions or activities by providing input to game interface 200.

In the example online game illustrated in FIG. 2, the user controls a virtual city implemented in an online social game. The game interface 200 shows the virtual city and various components of the city. The player can interact with various elements of the virtual city, such as virtual business objects 202 and virtual housing objects 204. The user can click on (or otherwise activate) various aspects of the game interface to provide instructions to the game engine. The game interface 200 also shows one or more elements to aid in realism of the virtual city, such as NPCs 206. The NPCs 206 comprise one or more representations of persons who may be walking, sitting, eating, or otherwise engaged in some activity within the city in accordance with pre-determined or random activities determined by the game engine. Typically the user does not control the NPCs 206.

The user can also click on various icons in game interface 200 to activate various game options. For example, if the user clicks on one of the icons in option bar 208, the game engine will alter the game interface 200 to present the user with options for buying and selling virtual items for use in the virtual city. For example, the player could buy or sell virtual furniture, appliances, décor, windows, goods, etc. Similarly, the user can click on other icons in option bar 208 to access other game options.

One skilled in the art would appreciate that FIG. 2 is presented merely as an example of an embodiment of one type of online game and that the present disclosure is intended to encompass a variety of game types, including gambling games, role-playing games, puzzle games, etc.

Although some online games permit multiple players to interact with each other, such as via control of their respective player characters within an instance of the game, typically the interaction does not extend to user generated content (UGC) as it exists in social networking sites. For example, UGC such as generating tweets or following tweets on Twitter are considered to be "real social," which is typically absent in online games. Accordingly, it would be beneficial to provide UGC as it exists in social networks in online games.

In some embodiments, the game engine is configured to provide information from a social network platform in an online game, provide user interaction features pertaining to the social network within the online game, and coordinate synchronization of information between the social network and the game. The social network may be hosted on the social networking system 120a or some other system. Examples of social networks include, but are not limited to, Twitter, Posterous, FriendFeed, Tumblr, Dailybooth, 12 Seconds, micro blogging platforms, blogging platforms, social network platforms, and the like.

Figure 3:
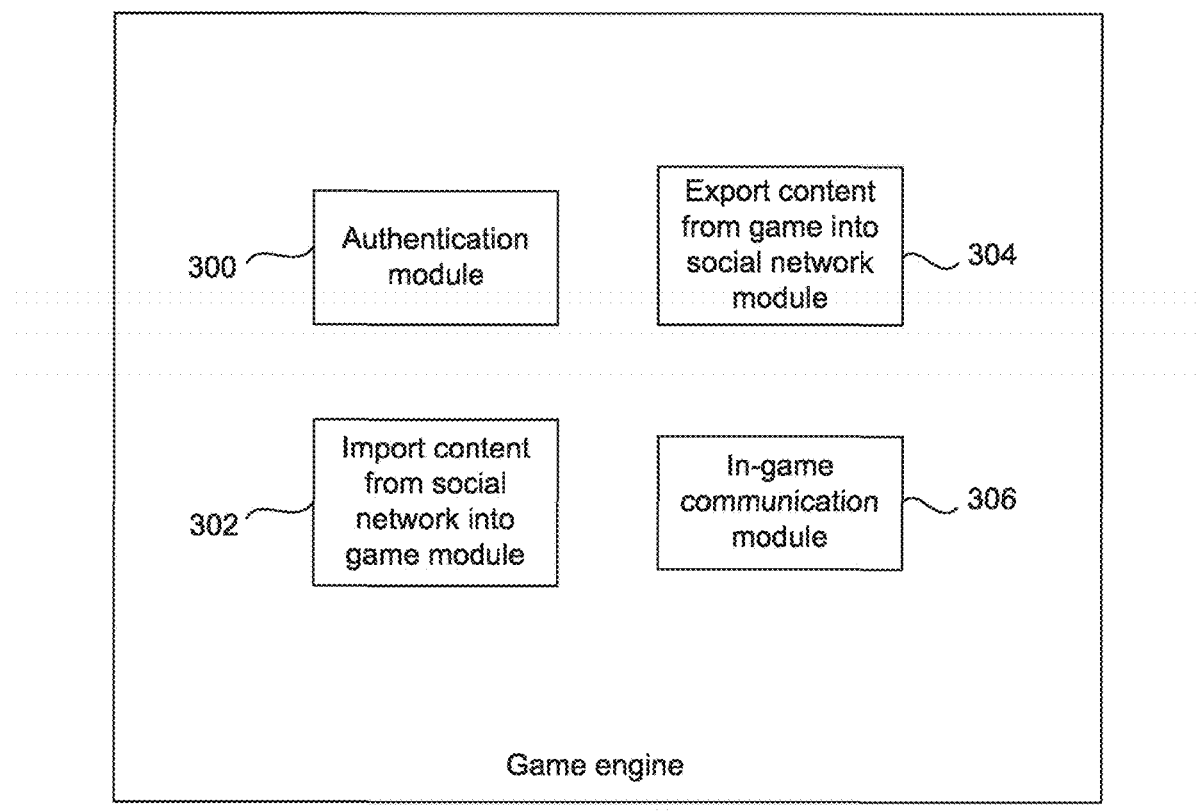
FIG. 3 illustrates an exemplary game engine including modules for meshing social network features in a game according to some embodiments.
Figure 4A:
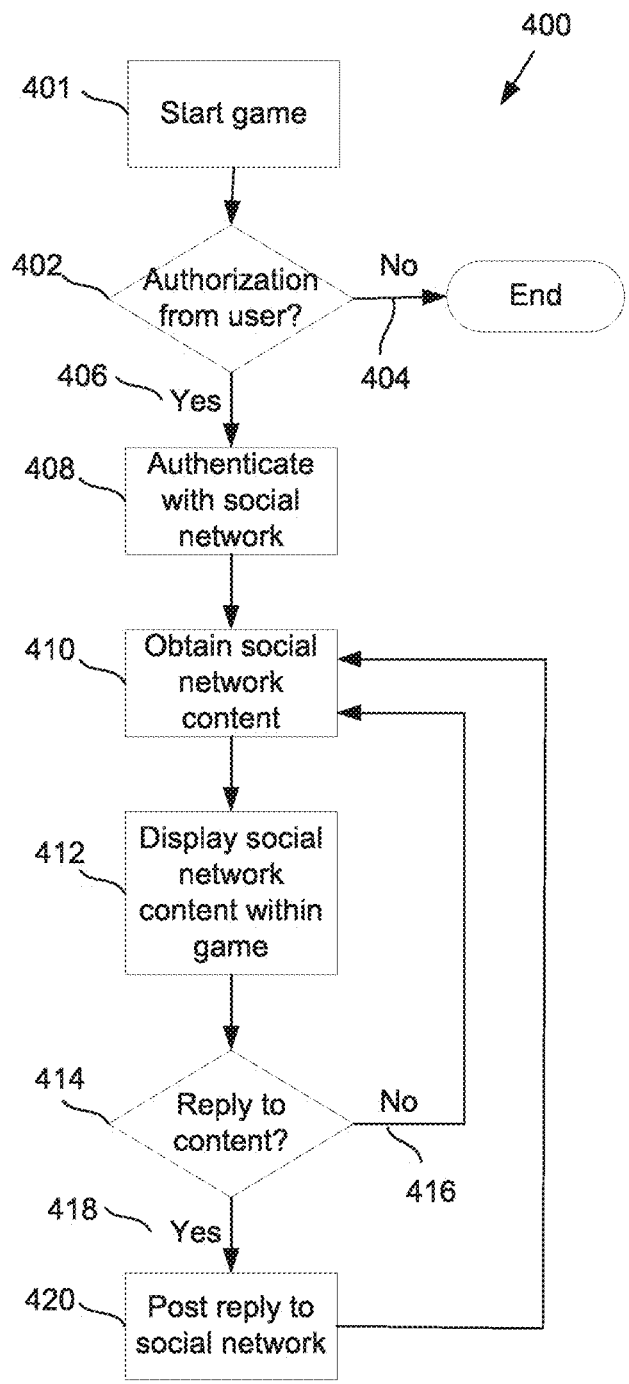
FIGS. 4A-4B illustrates flow diagrams for providing social network features in a game according to some embodiments.

FIG. 3 illustrates an exemplary game engine including modules for meshing social network features in a game according to some embodiments. The game engine includes an authentication module 300, an import content module 302, an export content module 304, and an in-game communication module 306. FIG. 4A illustrates a flow diagram 400 for providing social network features in a game according to some embodiments. FIG. 3 will be described in conjunction with FIG. 4A.

When an instance of an online game is started (block 401), the authentication module 300 is configured to check authorization from a user of the game about incorporating social network features into the game (block 402). The social network features comprise features or content associated with the user's account on a social network. In one embodiment, the game presents an authorization request to the user each time the game is accessed by the user. In another embodiment, the game presents an authorization request to the user once, and then the authorization is considered to be on-going in subsequent sessions of the game. In still another embodiment, the game presents an initial authorization request to the user and then periodically repeats the authorization request, because the user's authorization is valid for a pre-determined period of time or number of game sessions.

Figure 5A:
FIGS. 5A-5F illustrates exemplary screenshots showing social network features with the game according to some embodiments.
Figure 5B:

FIGS. 5A-5B illustrates exemplary screenshots 500 and 502 of an authorization request displayed to the user according to some embodiments. In the example shown in screenshots 500, 502, the social network is Twitter and the social network incorporation feature is referred to as City Talk. If the user declines the authorization request (no branch 404), then the game continues without incorporating social network features. Otherwise the user accepts the authorization request (e.g., clicks on the "Sign in" button in screenshot 502) (yes branch 406), and the user explicitly authorized the game to access content associated with his or her account at the social network.

Returning to FIGS. 3 and 4A, in one embodiment, the authentication module 300 performs authentication for the particular user with the social network (block 408) using an authentication protocol such as, but not limited to, OAuth.

OAuth is configured to provide secure application programming interface (API) authorization. OAuth permits the user to approve an application (e.g., an online game) to act on his/her behalf without sharing his/her social network password with the application. A successful authentication typically returns to the game an access token or some kind of authorization/authentication identifier for the particular user. This access token is stored by the game for subsequent use. Continuing the above example, the access token permits the game to communicate with one or more Twitter APIs. Twitter REST API, Twitter Streaming API, and/or Twitter Search API are examples of particular Twitter APIs that may be accessed to obtain Twitter content associated with the user, as discussed below. In another embodiment, rather than using OAuth, Hypertext Transfer Protocol (HTTP) basic authentication may be used to access one or more Twitter APIs.

Next at a block 410, the import content module 302 is configured to obtain content associated with the user from the social network (e.g., via the Twitter APIs). Continuing the Twitter example, the import content module 302 obtains tweets (and its associated information) posting on the user's Twitter page in real-time or near real-time. These tweets are generated by other Twitter users (also referred to as Twitter friends) that the user subscribes or follows. Associated information pertaining to the tweets can include a photo of each of the user's Twitter friends, their Twitter usernames, etc. As another example, the game may obtain a list of the user's friends on the social network.

At least a portion of the social network content that was obtained is then displayed within the game (block 412). Depending on the existing content of the game, the social network content can be overlaid onto the game's existing content to make the game even more interactive or realistic. In one embodiment, each of the NPCs displayed within in the game may be used as an avatar for the user's friends in the social network, and social network content associated with the user's friends may be respectively displayed with each of the NPCs/avatars within the game. The social network content may be displayed with a NPC similar to a caption. NPCs that were previously non-interactive elements within the game are now interactive elements that are additionally directly relevant to the user.

Figure 5C:
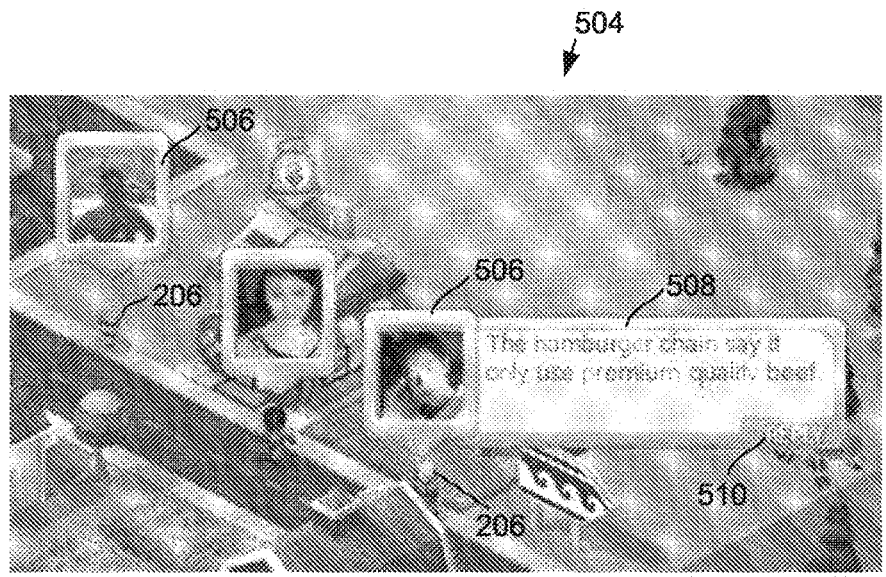

Continuing the Twitter example, FIG. 5C illustrates an exemplary screenshot 504 in accordance with some embodiments. The screenshot 504 comprises social network content displayed within the game. In particular, each of the NPCs 206 is associated with a respective user's friend in the social network, and content associated with the user's friends is respectively displayed for each of the NPCs 206. For each NPC 206 displayed in the game, at least a photograph 506 or other pictoral or textual identifier of a different user's friend from the social network can be displayed. When the user indicates interest or otherwise interacts with a particular NPC 206 (e.g., mouses near or over the particular NPC 206), additional information such as, but not limited to, a tweet posting 508 and a reply button 510 are displayed for a given user's friend at a NPC 206. In an alternate embodiment, the photograph 506, tweet posting 508, and the reply button 510 can be displayed for more than one NPC 206 regardless of the user's indication of interest in a particular NPC 206. In any case, as each NPC 206 moves within the game, the social network content displayed with that NPC also moves within the game.

If the number of the user's friends on the social network with current postings exceeds the number of NPCs 206 displayed in the game, then the import content module 302 may be configured to obtain content from a random subset of the user's friends that match the maximum number of NPCs 206 displayed in the game. In another embodiment, the import content module 302 may be configured to dynamically associate a particular user's friend with a particular NPC 206 based on the most current tweet postings. If, for example, user's friend A is generating current posts while user's friend B is not posting, then user's friend B may not be associated with an NPC until and unless he/she starts generating a post. Hence, NPCs within the game have become interactive elements (e.g., they have become the user's citizens), now directly pertinent to the user since they provide the latest status information about the user's friends, and serves as a gateway for real-time interaction with the user's friend(s). Conversely, if the number of the user's friends on the social network is less than the number of NPCs 206, the game engine may randomly select a subset of NPCs 206 to be associated with the user's friends on the social network. In other embodiments, any existing or newly created object in the game can be (visually) associated with the social network content pertaining to the user. Such existing or newly created object can be an animate or inanimate object within the game, and can even comprise a toolbar or similar navigation icons within the game.

Figure 5D:
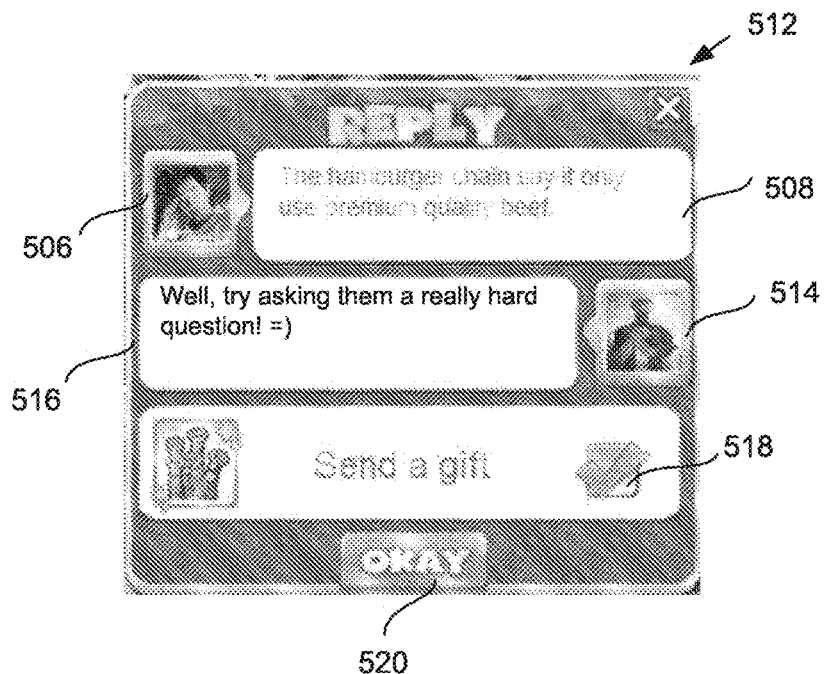

Returning to FIGS. 3 and 4A, the in-game communication module 306 is configured to detect the user's indication to reply to a social network friend's post (block 414). When the user clicks on the reply button 510 for a particular NPC 206 (yes branch 418), the in-game communication module 306 is additionally configured to provide a reply interface to the user. FIG. 5D shows an exemplary screenshot 512 comprising a reply interface according to some embodiments. The screenshot 512 includes a first portion repeating the friend's post previously shown in screenshot 504, a second portion for the user to input a reply, and a third portion to include a gift with the user's reply. The first portion may include the photograph 506 and the post 508; the second portion may include a photograph or other social network identifier 514 of the user and an input field 516 for the user to input a reply to the post 508; and the third portion may include an option 518 to include a gift with the reply (e.g., a check box).

Figure 5E:
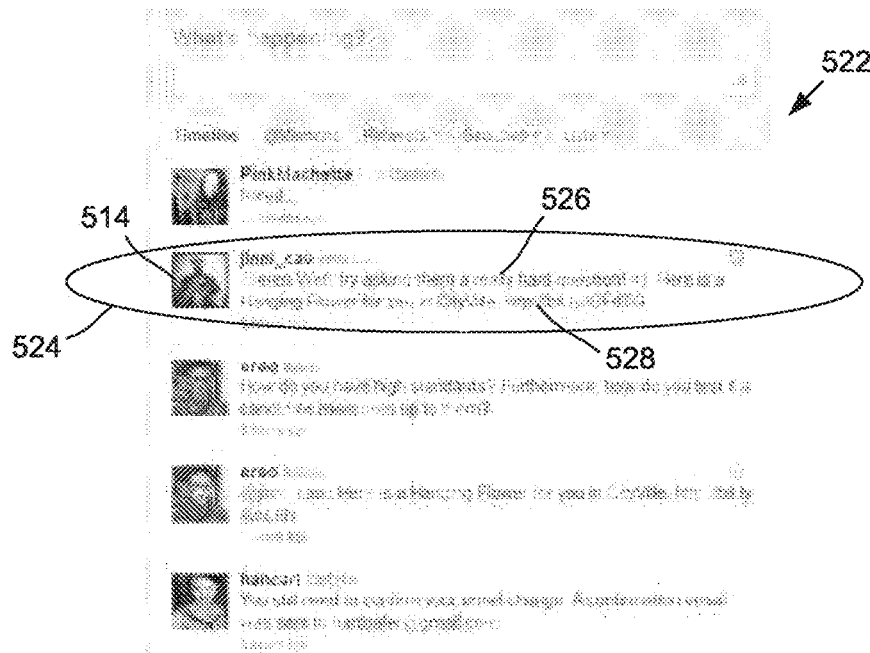

Once the user has completed composing a reply (e.g., the user clicks an Okay button 520), the export content module 304 posts the reply to the social network (block 420). Continuing the Twitter example, the export content module 304 can use the Twitter APIs (and stored access token) to post the reply without knowing or using the user's Twitter password (similar to how the import content module 302 obtains the tweets without needing the user's password). FIG. 5E shows an example of the user's friend's Twitter page 522 displaying tweets from people that the friend is following. A user's reply post 524 that was generated within the game (see FIG. 5D) is automatically posted on page 522. The user's reply post 524 comprises the photograph 514 identifying the user, a reply 526 inputted to the input field 516 (see FIG. 5D), and a gift link 528 in response to the user selecting the option 518 to include a gift with his/her reply.

If the user does not express an interest in replying to any of the displayed posts (no branch 416), then the import content module 302 continues to obtain the most current posts from the social network (block 410) for display within the game (block 412). The import content module 302 similarly continues to obtain and display the most current posts from the social network once a reply generated within the game has been posted to the social network (block 420).

Figure 4B:
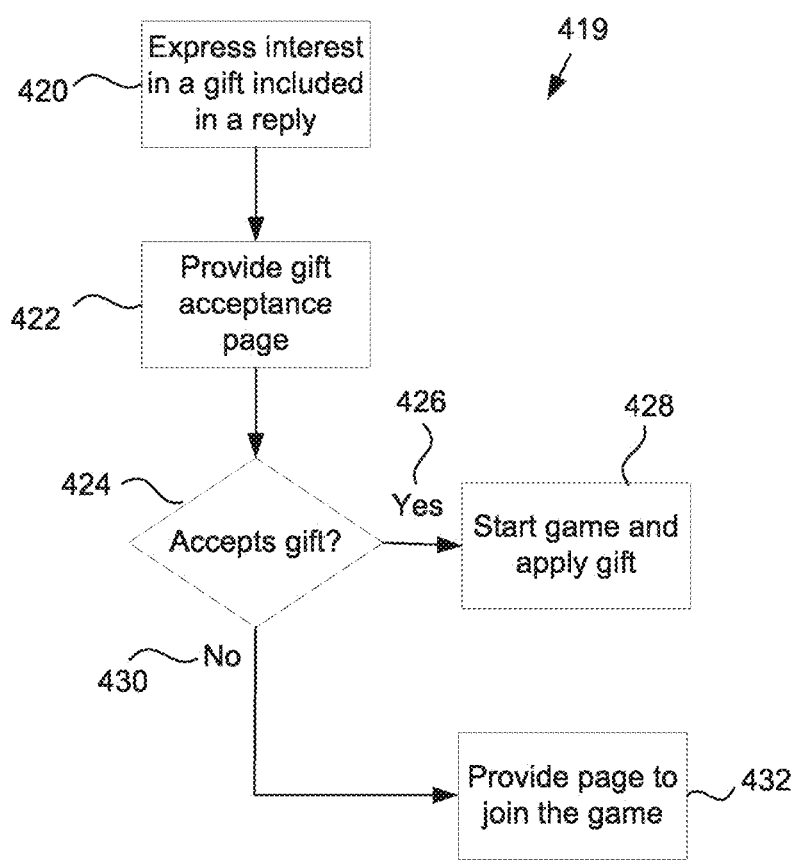
Figure 5F:
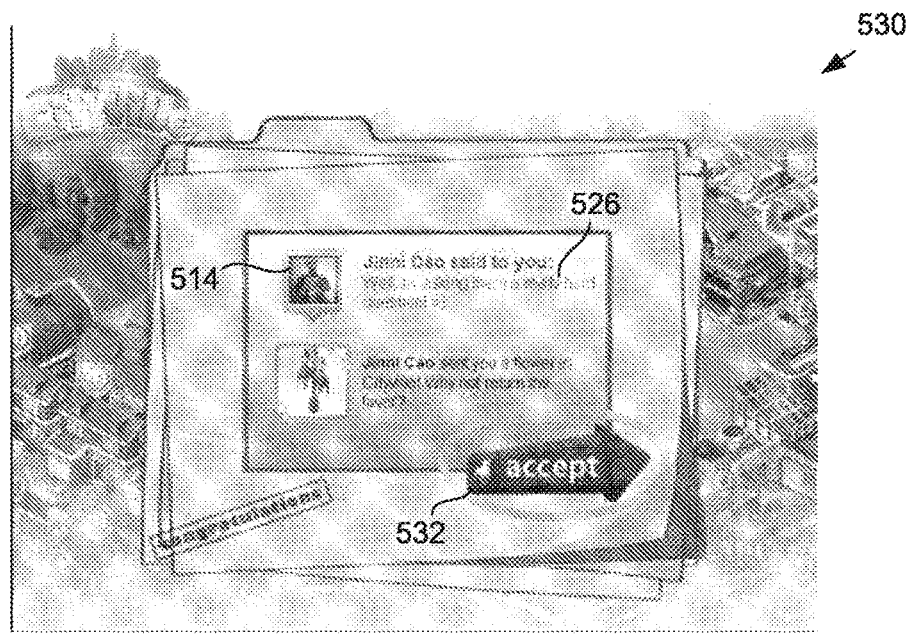

FIG. 4B illustrates an exemplary flow diagram 419 for the user's friend that received the user's reply post 524 to access the game starting from the social network platform according to some embodiments. If the friend clicks on the gift link 528 included in the user's reply post 524 on his social network page (see FIG. 5E) (block 420), the gift link 528 comprises a uniform resource locator (URL) to a particular page provided by the game engine (block 422). In one embodiment, the particular page may be a gift acceptance page 530 shown in FIG. 5F. The gift acceptance page 530 includes content associated with the user's reply post 524 such as, but not limited to, the photograph 514 identifying the user that generated the reply and sent the gift, the reply post 526, information about the gift, suggestion to reciprocate with a gift to the user, an accept the gift button 532, and/or other actions pertaining to redemption of the gift. In another embodiment, the gift acceptance page 530 may contain different content than discussed above, as long as it pertains to the gift sent by the user.

The gift sent to the user's friend may encompass a variety of gifts selected by the game engine. In one embodiment, the same default gift may be provided to all social network posts (that also indicated inclusion of a gift) generated within the game. In another embodiment, the game engine may be configured to provide customized gifts depending on the profile of the user or the friend. For example, if the user has a large number of friends, the user may be deemed to be influential and it may be advantageous to provide gifts to the user's friends that are more generous than a default gift. Similarly, if the user or friend is a known celebrity or other well-known person, it may be advantageous to provide a higher than average gift to entice that person to play the game and spread the word about the game. In still another embodiment, the user's activities within the game (e.g., how much time is spent playing the game or how much money is spent playing the game) may determine the level of gift to send to the user's friend. In yet still another embodiment, the game engine may randomly select from a pre-set group of gifts. In another embodiment, the game engine may study the click-through success rate of sent gifts and increase successive use of those gifts with the highest click-through success rates.

Examples of gifts include, but are not limited to, a certain amount of points, currency, items, or other items having a denomination of value within the game, a monetary credit that can be used as real money within the game, an insider tip to advance in the game, other real or virtual item pertaining to game play, and the like. The denominational value or type of gift may change over time and may encompass any possibility that relates to playing or joining the game.

If the user's friend accepts the gift (block 424) by, for example, clicking on the accept button 532 (yes branch 426), the game engine provides a page for the friend to try the game for the first time or to login using an existing username and password. When the game starts, the accepted gift is applied for use within the game (block 428).

If the user's friend declines the gift (no branch 430), the game engine is configured to provide a page for the friend to try the game for the first time or to login using an existing username and password (block 432). In another embodiment the game engine may provide additional or alternative content to the friend to entice him/her to accept the gift again or otherwise try the game for the first time.

Once the user's friend plays the game, joining for the first time or as an existing player, he or she can also enjoy "real social" interaction with his/her own friends on the social network from within the game (as set forth in flow diagram 400).

Figure 6:
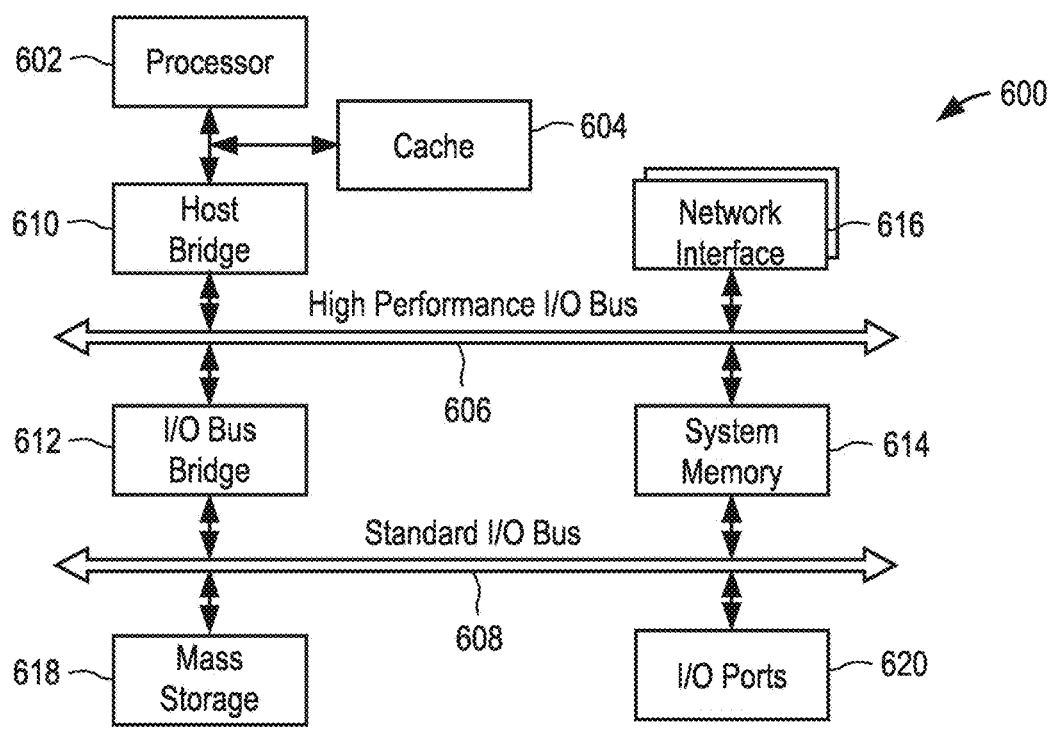
FIG. 6 illustrates an example computing system architecture, which may be used to implement one or more components of the system of FIG. 1.

FIG. 6 illustrates an example computing system architecture, which may be used to implement the server 120a, 120b, or the client system 130. In one embodiment, hardware system 600 comprises a processor 602, a cache memory 604, and one or more executable modules and drivers, stored on a tangible computer readable medium, directed to the functions described herein. Additionally, hardware system 600 may include a high performance input/output (I/O) bus 606 and a standard I/O bus 608. A host bridge 610 may couple processor 602 to high performance I/O bus 606, whereas I/O bus bridge 612 couples the two buses 606 and 608 to each other. A system memory 614 and one or more network/communication interfaces 616 may couple to bus 606. Hardware system 600 may further include video memory (not shown) and a display device coupled to the video memory. Mass storage 618 and I/O ports 620 may couple to bus 608. Hardware system 600 may optionally include a keyboard, a pointing device, and a display device (not shown) coupled to bus 608. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 600 are described in greater detail below. In particular, network interface 616 provides communication between hardware system 600 and any of a wide range of networks, such as an Ethernet (e.g., IEEE 802.3) network, a backplane, etc. Mass storage 618 provides permanent storage for the data and programming instructions to perform the above-described functions implemented in servers, whereas system memory 614 (e.g., DRAM) provides temporary storage for the data and programming instructions when executed by processor 602. I/O ports 620 are one or more serial and/or parallel communication ports that provide communication between additional peripheral devices, which may be coupled to hardware system 600.

Hardware system 600 may include a variety of system architectures and various components of hardware system 600 may be rearranged. For example, cache 604 may be on-chip with processor 602. Alternatively, cache 604 and processor 602 may be packed together as a "processor module," with processor 602 being referred to as the "processor core." Furthermore, certain embodiments of the present disclosure may not require nor include all of the above components. For example, the peripheral devices shown coupled to standard I/O bus 608 may couple to high performance I/O bus 606. In addition, in some embodiments, only a single bus may exist, with the components of hardware system 600 being coupled to the single bus. Furthermore, hardware system 600 may include additional components, such as additional processors, storage devices, or memories.

An operating system manages and controls the operation of hardware system 600, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other embodiments are possible. For example, the functions described herein may be implemented in firmware or on an application-specific integrated circuit.

Furthermore, the above-described elements and operations can be comprised of instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions are operational when executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

In this manner, real-time or near real-time social network content can be obtained from a social network platform for presentation within an online game, and the user of the game may interact with the social network content such as composing content in direct response to the displayed content. Supplemental content, such as a gift for use within the game, may be included in the user composed content. The system then automatically provides the user's composed content back to the social network platform for posting at a social network page of the intended recipient of the user composed content (e.g., the user's friend). When the recipient actuates the gift from within the social network, the recipient is taken to a webpage associated with the game. In particular, the recipient is presented an interface for accepting the gift and playing the game himself.

One or more features from any embodiment may be combined with one or more features of any other embodiment without departing from the scope of the disclosure.

A recitation of "a", "an," or "the" is intended to mean "one or more" unless specifically indicated to the contrary. In addition, it is to be understood that functional operations, such as "awarding", "locating", "permitting" and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, personal digital assistance, personal gaming device, etc.), that makes API calls directly to a server. Still further, while the embodiments described above operate with business-related virtual objects (such as stores and restaurants), the invention can be applied to any in-game asset around which a harvest mechanic is implemented, such as a virtual stove, a plot of land, and the like. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

What is claimed is:

1. A method for providing social network content in a computer-implemented game, the method comprising:
    retrieving, using a processor, social network content generated by a first social network account, in a social network service, having a social network connection with a second social network account of a user of the game, the social network content including a message generated by the first social network account;
    identifying a non-interactive game element displayed within a user interface of the game;
    changing the non-interactive game element to an interactive game element representative of the first social network account;
    displaying the social network content coincident with display of the interactive game element;
    in response to detecting an actuation action applied to the interactive game element by the user of the game, displaying a communications functionality, the communications functionality including a selectable reply functionality;
    receiving a selection of the reply functionality by the user of the game;
    receiving at the communications functionality gaming content generated by the user of the game; and
    transmitting the gaming content generated by the user to the first social network account.

2. The method of claim 1, further comprising automatically posting the gaming content to a portion of the social network service associated with and accessed by the first social network account.

3. The method of claim 1, wherein the social network service comprises a microblogging network, and the social network content comprises content posted in real-time or near real-time on the social network service.

4. The method of claim 1, wherein the game comprises an online game.

5. A non-transitory computer readable medium including instructions, when executed by a processor, causes the processor to perform operations comprising:
    retrieving, using a processor, social network content generated by a first social network account, in a social network service, having a social network connection with a second social network account of a user of the game, the social network content including a message generated by the first social network account;
    identifying a non-interactive game element displayed within a user interface of the game;
    changing the non-interactive game element to an interactive game element representative of the first social network account;
    displaying the social network content coincident with display of the interactive game element;
    in response to detecting an actuation action applied to the interactive game element by the user of the game, displaying a communications functionality, the communications functionality including a selectable reply functionality;

receiving a selection of the reply functionality by the user of the same;

receiving at the communications functionality gaming content generated by the user of the game; and transmitting the gaming content generated by the user to the first social network account.

6. The computer readable medium of claim 5, further comprising automatically posting the gaming content to a portion of the social network service associated with and accessed by the first social network account.

7. The computer readable medium of claim 5, wherein the gaming content comprises a reply that includes a gift, for the first social network account, that pertains pertaining to the game.

8. The computer readable medium of claim 5, wherein the social network service comprises a microblogging network, and the social network content comprises content posted in real-time or near real-time on the social network.

9. A computer system, comprising:

a processor;

a memory device holding an instruction set executable on the processor to cause the computer system to perform operations comprising:

retrieving, using a processor, social network content generated by a first social network account having a social network connection with a second social network account of, the social network content including a message generated by the first social network account identifying a non-interactive game element displayed within a user interface of the game;

changing the non-interactive game element to an interactive game element representative of the first social network account;

displaying the social network content coincident with display of the interactive game element;

in response to detecting an actuation action applied to the interactive game element by the user of the game, displaying a communications functionality, the communications functionality including a selectable reply functionality;

receiving a selection of the reply functionality by the user of the game;

receiving at the communications functionality gaming content generated by the user of the game; and transmuting the gaming content generated by the user to the first social network account.

10. The computer system of claim 9, wherein the operations further comprise:

automatically posting the gaming content to a portion of the social network service associated with and accessed by the first social network account.

11. The computer system of claim 9, wherein the social network service comprises a microblogging network, and the social network content comprises content posted in real-time or near real-time on the social network service.

12. The computer system of claim 9, wherein the game comprises an online game.

13. The computer system of claim 9 wherein the gaming content comprises a reply that includes a gift, for the first social network account, that pertains pertaining to the game.

\* \* \* \* \*

UNITED STATES PATENT AND TRADEMARK OFFICE
CERTIFICATE OF CORRECTION

| | | |
|---|---|---|
| PATENT NO. | : 9,844,728 B2 | Page 1 of 1 |
| APPLICATION NO. | : 14/358967 | |
| DATED | : December 19, 2017 | |
| INVENTOR(S) | : Cao et al. | |

It is certified that error appears in the above-identified patent and that said Letters Patent is hereby corrected as shown below:

In the Specification

In Column 3, Line 19, delete "120" and insert --120a-- therefor

In Column 7, Line 52, delete "pictoral" and insert --pictorial-- therefor

In the Claims

In Column 13, Line 5, in Claim 5, delete "same;" and insert --game;-- therefor

In Column 13, Line 31, in Claim 9, delete "account" and insert --account;-- therefor In Column 14, Line 15, in Claim 9, delete "transmuting" and insert --transmitting-- therefor Signed and Sealed this
Twenty-first Day of April, 2020

Andrei Iancu
*Director of the United States Patent and Trademark Office*